(12) United States Patent
Stavely

(10) Patent No.: US 6,535,249 B1
(45) Date of Patent: Mar. 18, 2003

(54) DIGITAL CAMERA OPTICAL SYSTEM WITH FIELD LENS

(75) Inventor: Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/185,326

(22) Filed: Nov. 3, 1998

(51) Int. Cl.[7] .................. H04N 5/225; H04N 5/335; G02B 13/22
(52) U.S. Cl. .................. 348/340; 348/272; 359/663
(58) Field of Search .................. 348/335, 340, 348/272, 273, 374; 359/663, 569, 656–661

(56) References Cited

U.S. PATENT DOCUMENTS

| | | | | |
|---|---|---|---|---|
| 4,131,919 A | | 12/1978 | Lloyd et al. ............... 360/9 |
| 4,420,773 A | | 12/1983 | Toyoda et al. ............. 358/335 |
| 4,541,010 A | | 9/1985 | Alston .................... 358/44 |
| 5,024,530 A | * | 6/1991 | Mende ................... 359/640 |
| 5,208,674 A | * | 5/1993 | Setchell, Jr. ............. 348/273 |
| 5,499,138 A | * | 3/1996 | Iba ...................... 359/569 |
| 5,621,461 A | * | 4/1997 | Higashide ............... 348/302 |
| 5,625,495 A | * | 4/1997 | Moskovich .............. 359/663 |
| 5,704,896 A | * | 1/1998 | Fukunishi et al. ......... 348/340 |
| 6,198,577 B1 | * | 3/2001 | Kedar et al. ............. 359/663 |
| 6,233,003 B1 | * | 5/2001 | Ono ..................... 348/47 |
| 6,326,998 B1 | * | 12/2001 | Palum ................... 348/342 |

* cited by examiner

Primary Examiner—Wendy R. Garber
Assistant Examiner—Lin Ye

(57) ABSTRACT

An optical system for detecting image light in a digital camera includes an electronic sensor having an area array of pixels for detecting the image light. A field lens is positioned adjacent the electronic sensor so as to be substantially in the path of the image light for directing the image light onto the area array of pixels. The field lens straightens the image light so that the straightened image light rays are substantially parallel to an optical axis of the digital camera.

17 Claims, 10 Drawing Sheets

Prior Art

DIGITAL CAMERA OPTICAL SYSTEM WITH FIELD LENS

FIELD OF THE INVENTION

The present invention relates generally to the field of digital cameras, and more particularly, to a system and method for directing image light onto an array of optical sensors in a digital camera.

BACKGROUND OF THE INVENTION

A digital camera 102, FIGS. 1 and 2, typically includes a lens system 106 for projecting and focusing the image of a subject onto the surface of an electronic sensor 116. Digital cameras are described in the following patents which are hereby incorporated by reference for all that is disclosed therein. U.S. Pat. Nos. 4,131,919, 4,420,773, and 4,541,010. The digital camera 102 may have a housing 104 with elements such as a display 112 to indicate the status of the digital camera 102, a button 110 which may be pushed to cause the digital camera 102 to take a picture, and a flash 114 to illuminate a subject. The electronic sensor 116 in a digital camera 102 comprises an area array sensor, i.e., a two-dimensional array of individual optical sensors, or pixels 126, 127, 129, 131, 133, etc., FIG. 12.

The image quality of a digital camera 102 is determined, in part, by the "spacial resolution," or the number of pixels 126, etc., in the electronic sensor 116. It is also determined by the bit-depth and signal-to-noise ratio of the pixels 126, etc., or the ability of the pixels to measure and quantify the image light, e.g. 118, 120, and 122, incident upon it.

A pixel 126 may be constructed in various known ways. Generally a pixel 126 is constructed of a material which converts image light 120 into electrical signals, which can then be processed and stored in the circuitry of the digital camera 102. As best seen in FIG. 3, a pixel 126 contains a light sensitive region 128 and one or more non-light sensitive regions 130 and 132. The ratio of light sensitive, or active, regions 128 to non-light sensitive regions 130 and 132 is referred to as the fill factor. The light sensitive region 128 may comprise a portion of a silicon wafer 134, which is surrounded by support circuitry such as polysilicon gates 136, 138, 142, and 144, metal conductors, channel stops, light shields 140 and 146, etc, forming a pit 148. The image light 120 must travel down through the pit 148 to the bottom where the light sensitive region 128 is located.

As digital cameras 102 are designed with higher resolution, requiring more pixels 126, the pixel size must necessarily be smaller to keep the overall size and cost of the digital camera 102 down. However, it is more difficult to scale down the electronic support circuitry constituting the non-light sensitive regions 130 and 132 than it is to scale down the light-sensitive region 128. Therefore, as pixels (e.g., 126) become smaller, the fill factor becomes smaller, and the ratio of the sizes of light sensitive 128 and non-light sensitive regions 130 and 132 in the pixel 126 is reduced. In other words, if a pixel 126 is scaled down to half the size, the scaled down pixel is less than half as sensitive to light as the larger pixel would be.

Microlenses 166, 168, FIGS. 3 and 4, have been employed to increase the fill factor of very small pixels. A microlens e.g. 166 is a small lens with approximately the same area as the entire associated pixel 126, and may be formed with photolithographic processes. The microlens 166 is positioned above the pixel 126, gathering nearly all the image light 120 incident on the pixel 126 and directing it to the light sensitive region 128 of the pixel 126, as best shown by FIG. 3.

As a result of the non-linearity of fill factor versus size described above, the light sensitive region 128 at the bottom of the pit 148 grows relatively smaller as pixel size decreases, and the height 150 of the pit wall increases, reducing the acceptable angle of incidence (e.g., 162, FIG. 4) of the image light 120. If the image light 120 is at too great an angle of incidence 162, it will terminate on the wall of the pit, such as on the light shields 140 and 146, rather than making it down to the light sensitive region 128 at the bottom of the pit 148.

Referring now to FIGS. 2, 3, and 4, placing microlenses 168 over the center of a pixel 152 has the disadvantage of only working well near the center of the optical axis 108 of the digital camera's 102 lens system 106. If a pixel (e.g. 152) is located at the periphery of the electronic sensor 116, remote from the optical axis 108 of the lens system 106, FIG. 4, the angle of incidence 162 of the image light 122 is larger than the angle of incidence 162 for pixels (e.g., 126) near the optical axis 108, FIG. 3. In the peripheral pixel location shown in FIG. 4, the image light 122 passes through the microlens 168 and is focused not on the light sensitive region 128, but on a non-light sensitive region 130 such as a light shield 140. As a result, such pixels (e.g., 152) near the periphery of the electronic sensor 116 detect less image light 122 than a more centered pixel and the image quality of the digital camera 102 is degraded.

Referring now to FIG. 5, one prior solution to the problem described above has been to shift the microlenses 264 and 268 at the periphery of the electronic sensor 216 in towards the optical axis 208, so that they are no longer centered over their respective pixels 224 and 252. The microlenses 264, 266, and 268 are shifted in towards the optical axis 208 as a function of distance of the corresponding pixel 224, 226, and 252 from the optical axis 208. For the pixels 226 near the optical axis 208, the corresponding microlenses 226 are not shifted or are not shifted very far towards the optical axis 208. For the pixels 224 and 252 farther out from the optical axis 208, the corresponding microlenses 264 and 268 are shifted a relatively larger distance towards the optical axis 208. The microlenses 264, 266, and 268 are placed so that the greatest possible amount of image light 218, 220, and 222 is focused and directed toward the light sensitive regions 228, 254, and 270.

This approach of shifting the microlenses 264, 266, and 268 has several disadvantages. First, the microlenses 264, 266, and 268 are less effective at focusing to a well defined spot at large angles of incidence 262. Second, the height 150 of the walls of the pits 148 limit the angle of incidence, e.g., 262, of the image light rays 218, 220, and 222 that allows the image light 218, 220, and 220 to reach the light sensitive regions 228, 254, and 270. A third problem arises when color filters 272, 274, and 276 are placed in the path of the image light 218, 220, and 222 in order to produce a color image. Since the image light rays 218 and 222 with a relatively high angle of incidence 262 pass through the color filters 272 and 276 at an angle, their path through the dye in the color filters is longer, thus they are more heavily filtered. This can result in undesirable color shifts from the center to the edges of the resulting images.

Another prior solution to the problems described above, illustrated in FIG. 6, is the use of a telecentric lens 378. Image light rays 318, 320, and 322 produced by a telecentric lens 378 are focused downward on the pixels 324, 326, and 352 at a consistent angle of incidence, independent of the original angles of incidence of the image light 318, 320, and 322 before passing through the telecentric lens 378. FIG. 6 illustrates how the image light 318, 320, and 322 is directed in paths which are substantially parallel to the optical axis 308. However, using a telecentric lens 378 in a digital camera 102 makes it much larger, more complex, and expensive. Typical telecentric lens designs for digital cameras 102 may have twice the length, diameter and cost as a comparable non-telecentric lens design for a conventional film camera.

A need therefore exists for a small, simple and inexpensive lens and electronic sensor system for a digital camera which can focus a substantial amount of image light on the light sensitive regions of the electronic sensor.

SUMMARY

To assist in achieving the aforementioned needs, the inventor has devised a system and method for using a field lens in a digital camera to focus and direct image light toward the pixels in an electronic sensor.

An optical system for detecting image light in a digital camera having features of the present invention comprises an electronic sensor having an area array of pixels for detecting the image light. One or more field lenses are positioned adjacent or in front of the electronic sensor so as to be substantially in the path of the image light. The one or more field lenses straighten the image light and direct it onto the area array of pixels. If more than one field lenses are used, they are each aligned over the optical axis of the optical system, forming a compound lens.

The electronic sensor is mounted in the digital camera in the path of the image light perpendicularly to the optical axis of the optical system. The field lens generally has a substantially flat bottom surface mounted adjacent the electronic sensor, and a convex upper surface.

The field lens is preferably mounted to the electronic sensor as the cover to the electronic sensor, or alternatively, if the electronic sensor is provided with a cover, the field lens may be mounted above the cover of the electronic sensor or mounted directly to the cover of the electronic sensor.

The present invention may also comprise a method for reducing the angle of incidence of image light rays falling upon an electronic sensor in a digital camera, including providing a field lens to straighten the image light rays, and mounting the field lens over the electronic sensor so as to be substantially in the path of the image light rays.

BRIEF DESCRIPTION OF THE DRAWING

An illustrative and presently preferred embodiment of the invention is illustrated in the drawing, in which.

DESCRIPTION OF THE PREFERRED EMBODIMENT

A digital camera 102 is used to take pictures which are stored digitally, in the form of electrical signals, rather than storing the pictures visually using chemicals in photographic paper. Digital images produced by a digital camera 102 must be processed by a computer to view or print them. As digital cameras 102 become more common and more sophisticated, lens systems 106 and electronic sensors 116 need to become smaller and less expensive.

Figure 7:
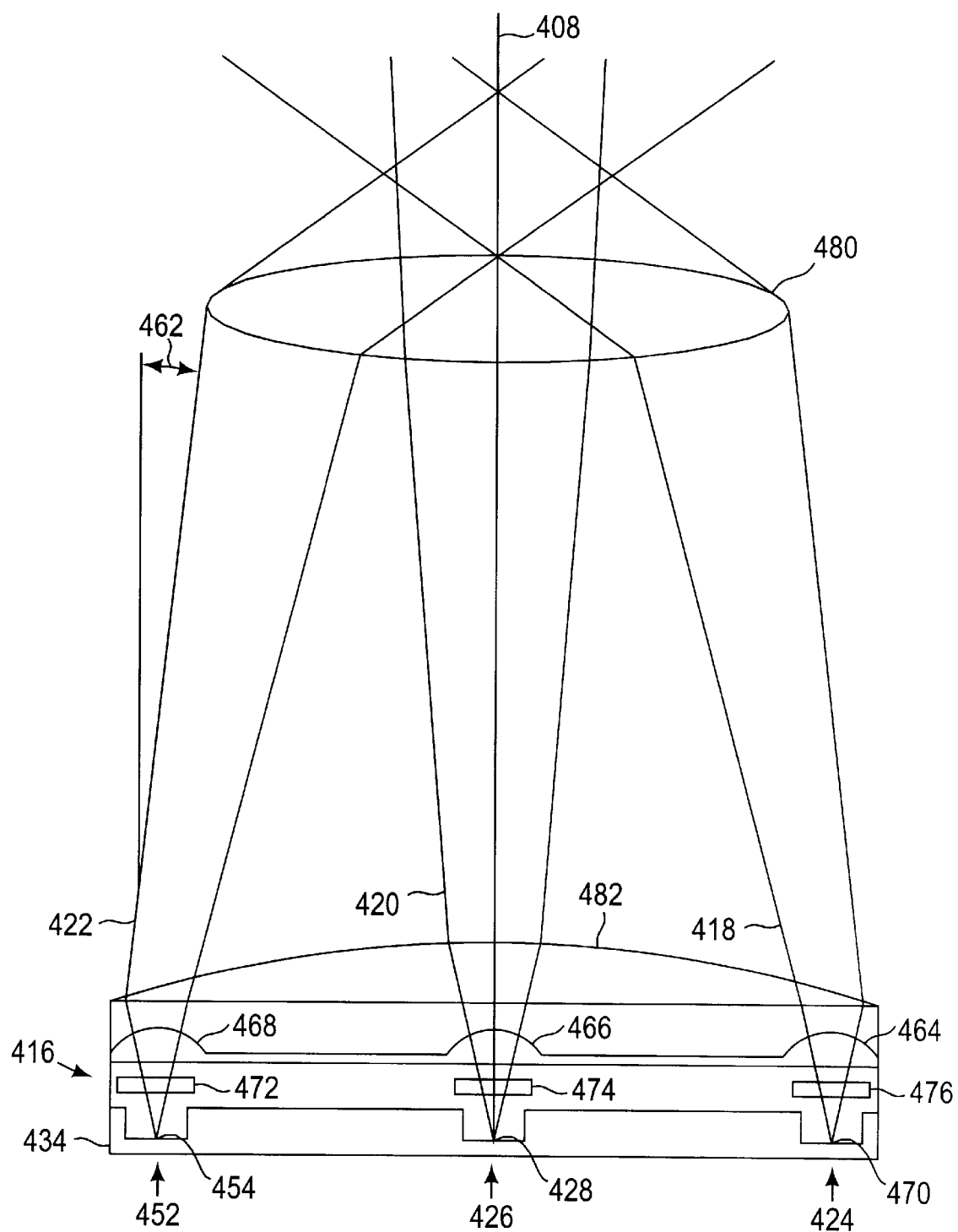
FIG. 7 is a cross-sectional view of a lens system and electronic sensor in a preferred embodiment comprising a field lens in use with a near-telecentric lens, in which the field lens comprises the cover of the electronic sensor.

A field lens 482 for a digital camera 102 significantly lowers the size and cost of the digital camera 102. As illustrated in FIG. 7, a preferred embodiment comprises a near-telecentric lens 480 to focus and direct image light 418, 420, and 422 onto an electronic sensor 416, and a field lens 482 placed between the near-telecentric lens 480 and the electronic sensor 416. A field lens 482 is a positive, or converging, lens, which changes the direction of a light path through it by refraction. A positive lens has a positive focal length, and thus causes light rays parallel to its axis to converge, and light rays 418 and 422 with non-zero angles of incidence 462 to emerge substantially parallel to its axis. The field lens 482 is preferably mounted near the electronic sensor 416 so that it has only a small effect on the performance of the rest of the optical system. As a result, the field lens 482 can be manufactured as a simple, single element molded plastic lens. The field lens 482 generally comprises a flat or nearly flat bottom surface and a convex top surface, and is nearly transparent to the desired wavelengths of the image light 418, 420, and 422. Field lenses 482 may be manufactured using any method now known or that may be developed in the future, such as grinding and polishing glass or molding plastic.

Figure 1:
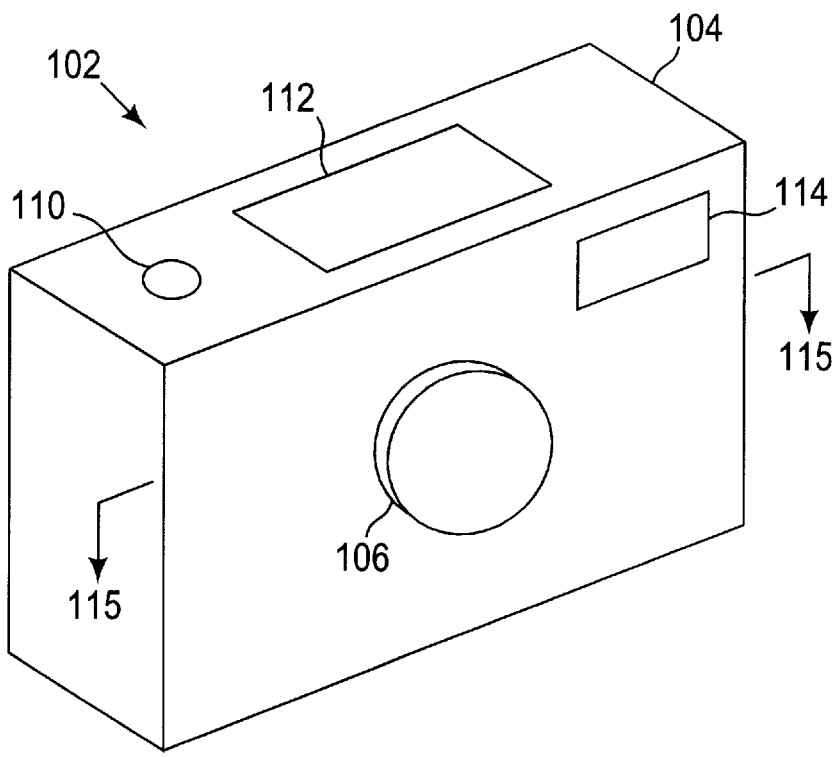
FIG. 1 is a perspective view of a digital camera.
Figure 2:
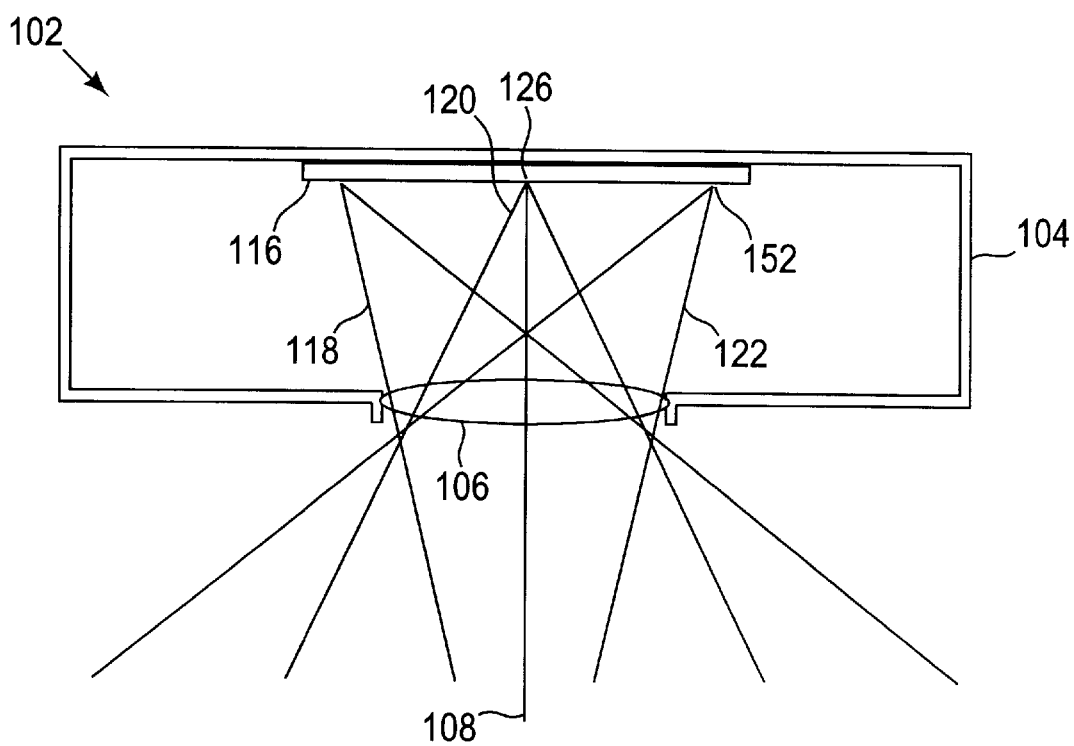
FIG. 2 is a cross-sectional top view of the digital camera of FIG. 1 taken along line 115.
Figure 3:
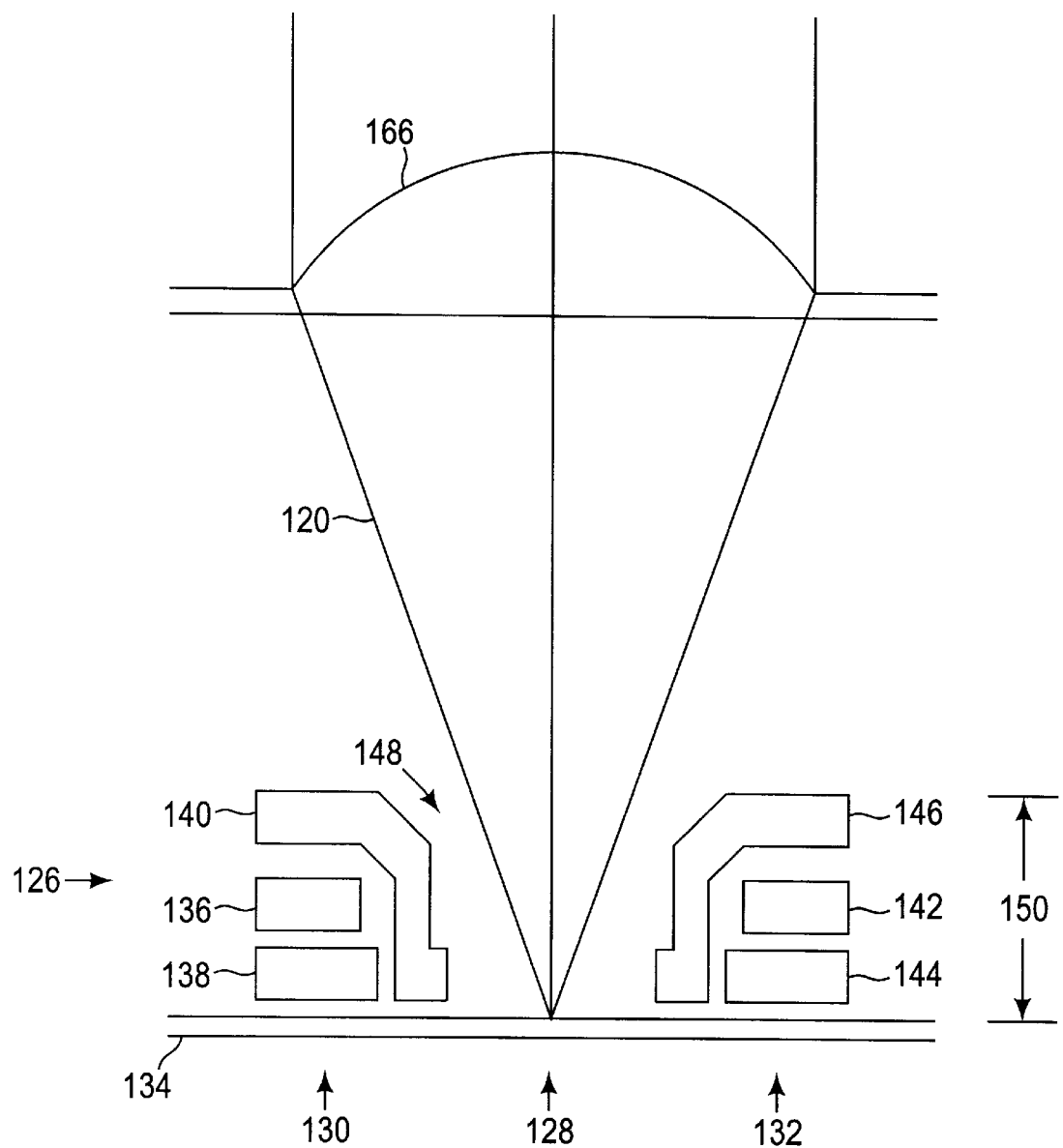
FIG. 3 is a cross-sectional view of a pixel in an electronic sensor of a digital camera.
Figure 4:
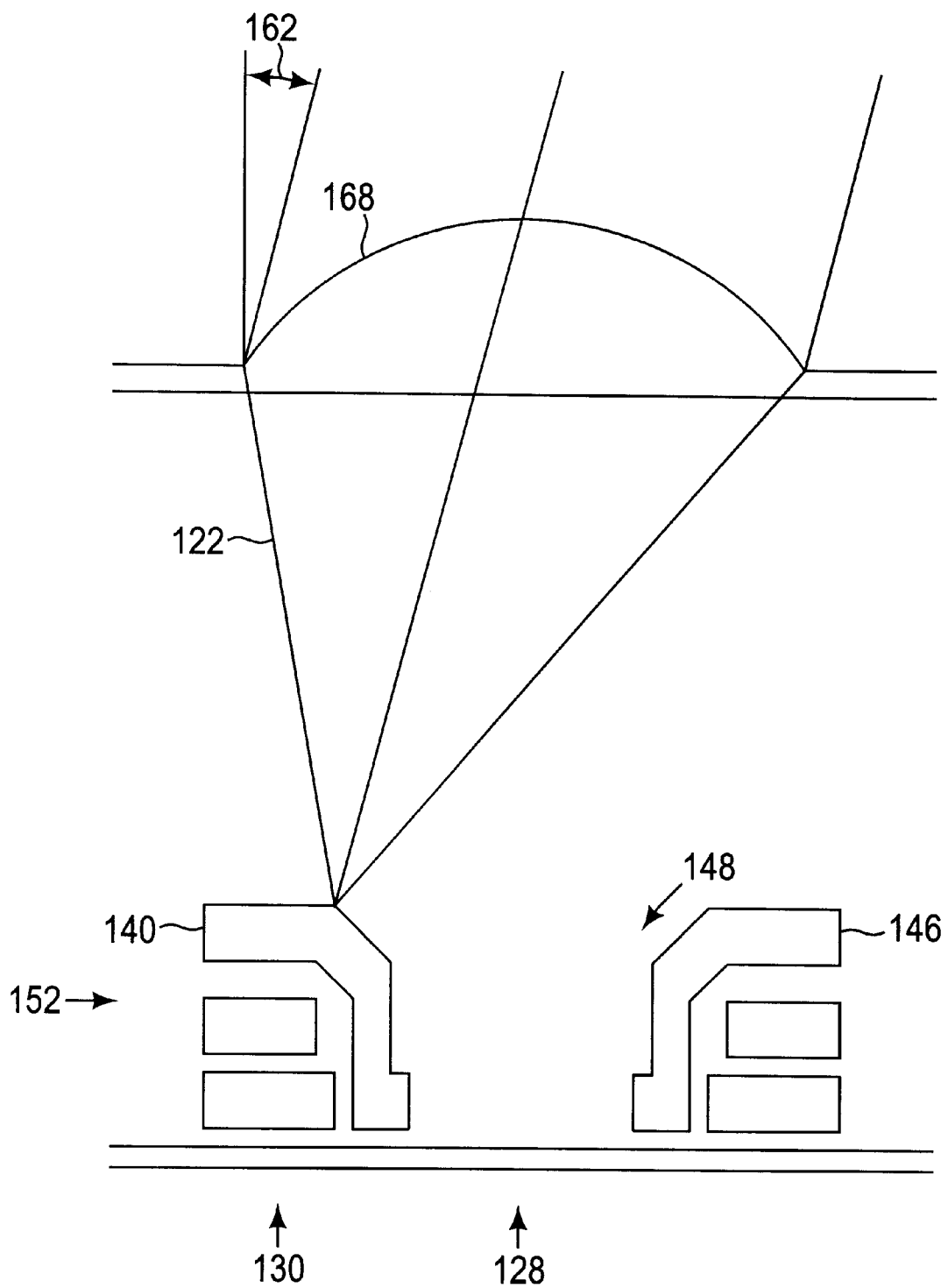
FIG. 4 is a cross-sectional view of a pixel in an electronic sensor of a digital camera illustrating an image light ray with a high angle of incidence.
Figure 5:
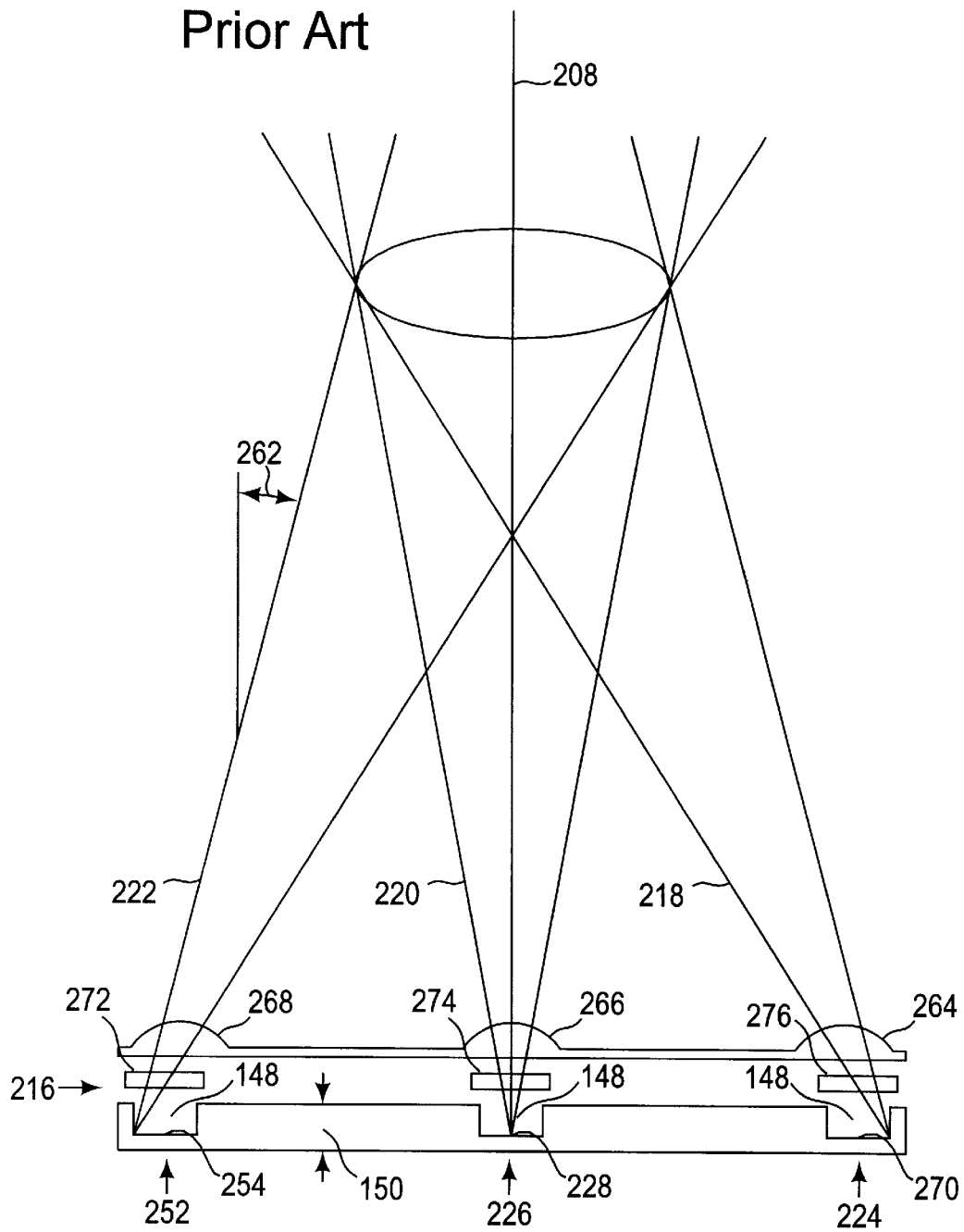
FIG. 5 is a cross-sectional view of a lens system and electronic sensor in which microlenses have been shifted toward the optical axis to correct for image light rays having high angles of incidence.
Figure 6:
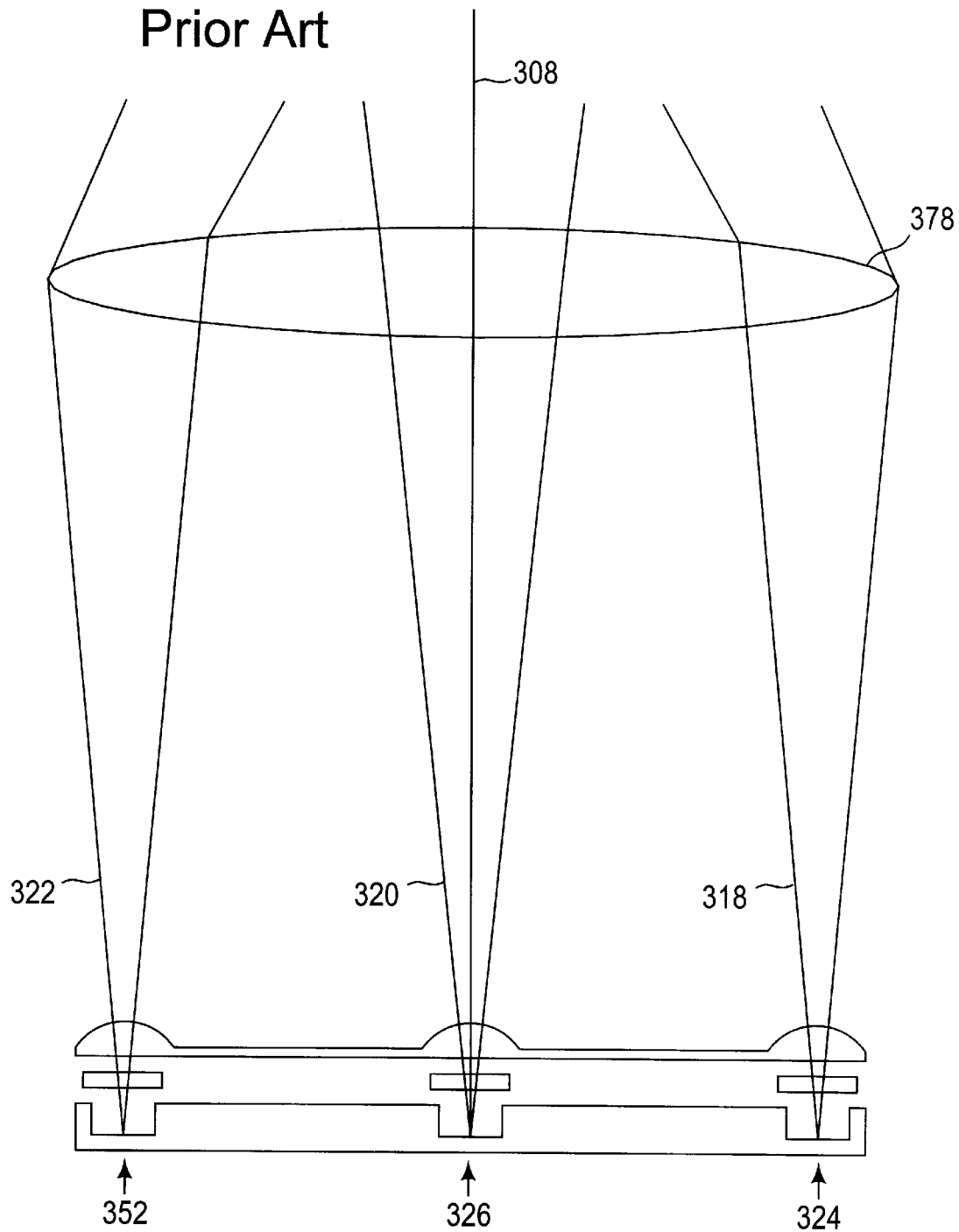
FIG. 6 is a cross-sectional view of a lens system and electronic sensor in which a telecentric lens is used to correct for image light rays having high angles of incidence.

The near-telecentric lens 480 of the preferred embodiment is less expensive and smaller than a more fully telecentric lens 378 as shown in FIG. 6, however, a near-telecentric lens 480 does not completely straighten image light 418, 420, and 422, as a telecentric lens 378 would. The field lens 482 is placed between the near-telecentric lens 480 and the electronic sensor 416 to substantially straighten the image light 418, 420, and 422 as it passes through the field lens 482.

The angle of incidence of a light path through the digital camera 102 is therefore somewhat reduced by the near-telecentric lens 480 and is further reduced to acceptable levels by the field lens 482.

The electronic sensor 416 comprises an area array, or two dimensional array, of light detecting pixels (e.g., 424, 426, and 452) formed on a silicon wafer 434. As will be described in more detail below with respect to FIG. 8, the image light 418, 420, and 422 must be substantially parallel to an optical axis 408 of the digital camera 102 in order to reach the light sensitive regions 470, 428, and 454 of the pixels 424, 426, and 452.

The electronic sensor 416 may further comprise color filters 472, 474, and 476 if a color image is desired. A color filter 472, 474, and 476 is typically either red, blue or green, and absorbs incident light having all wavelengths other than those in a given range. For example, red color filters absorb nearly all light wavelengths other than red, thus a red filter transmits the red portions of the image light. To produce a color image, pixels (e.g., 424, 426, and 452) in the electronic sensor 416 are covered by alternating colors of filters 472, 474, and 476, to detect either the red, blue, or green wavelengths of the image light 418, 420, and 422. The resulting red, blue, and green images are then recombined in the processing equipment used to display or print the image. The degree to which unwanted wavelengths of light are filtered out in the color filters 472, 474, and 476 is related to the length of the light path through the filters 472, 474, and 476. The field lens 482 greatly improves the quality of the resulting color image by causing the length of the light paths to be substantially the same through the filters 472, 474, and 476 in the center of the electronic sensor 416 and at its periphery, thus avoiding unwanted color shifts at the periphery of the resulting image.

The electronic sensor 416 may further comprise microlenses 464, 466, and 468 centered over each pixel 424, 426, and 452 to collect the image light 418, 420, and 422 incident on the entire area of each pixel 424, 426, and 452 and focus it on their respective light sensitive regions 470, 428, and 454.

In a preferred embodiment, the field lens 482 is attached to the top of the electronic sensor 416 to act as a protective cover to the delicate electronic and optical components within, as well as to fill the optical role of straightening the image light 418, 420, and 422.

Figure 8:
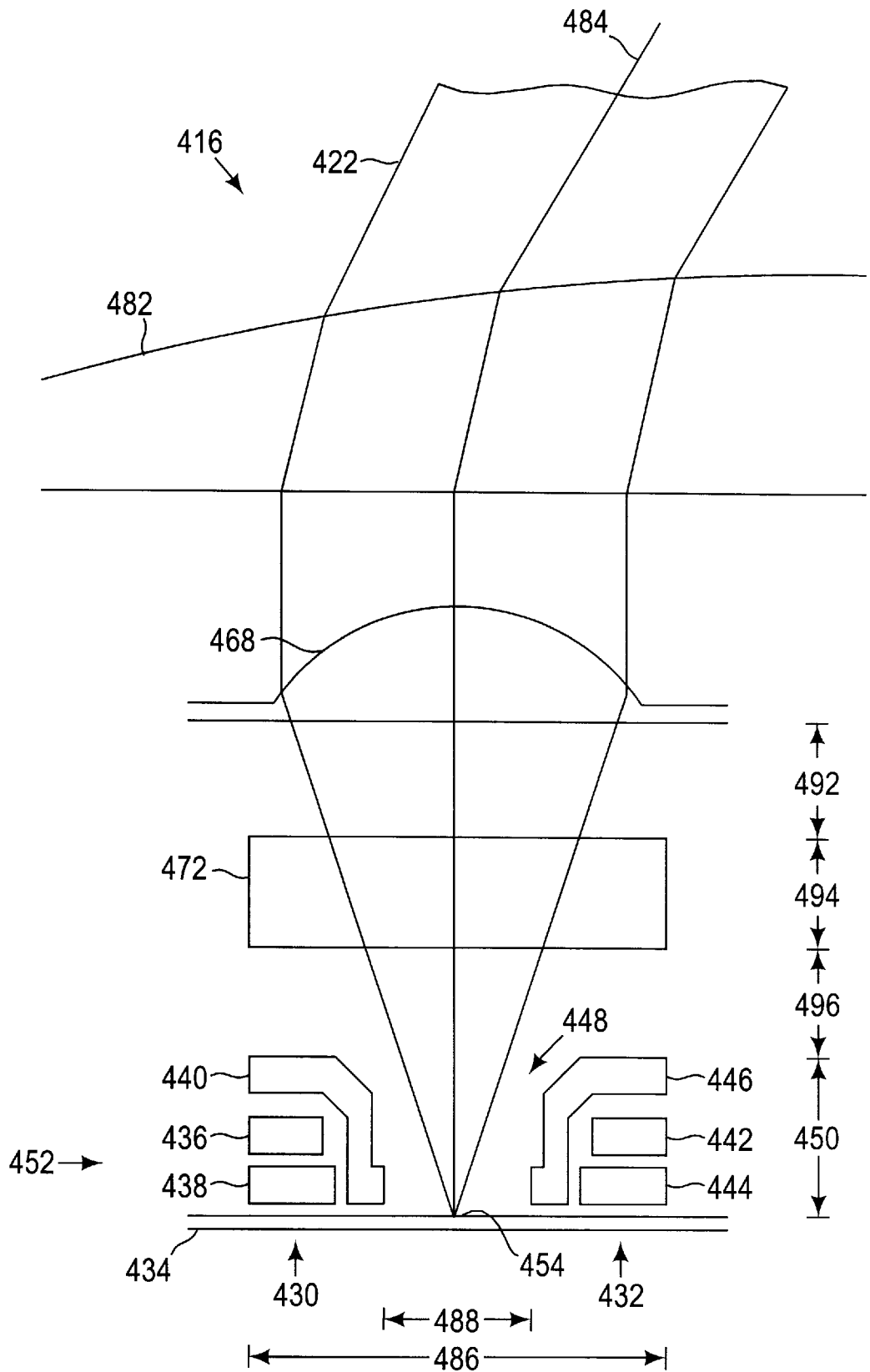
FIG. 8 is a cross-sectional view of a pixel in the embodiment of FIG. 7 with a field lens correcting for an image light ray with a high angle of incidence.

Referring now to FIG. 8, a pixel 452 in the electronic sensor 416 of FIG. 7 is shown in more detail. A field lens 482 is mounted at the top of the electronic sensor 416. A color filter 472 having a height 494 of about 1.5 $\mu$m is centered over the pixel 452 between the microlens 468 and the pixel 452 at a distance 492 of about 1.5 $\mu$m below the microlens 468 and a distance 496 of about 1.5 $\mu$m above the pixel 452.

The pixel 452 comprises a light sensitive region 454 on a silicon wafer 434, surrounded by non-light sensitive regions 430 and 432. The non-light sensitive regions 430 and 432 comprise electronic circuitry such as polysilicon gates 436, 438, 442, and 444, as well as other elements of integrated circuits, not shown. The electronic circuitry such as polysilicon gates 436, 438, 442, and 444 may be covered by light shields 440 and 446. These elements (e.g., 440 and 446) form a pit 448 through which the image light 422 must pass to reach the light sensitive region 454, necessitating a low angle of incidence. In a preferred embodiment, the pixel height 450 may be about 2 $\mu$m, while the width 488 of the light sensitive region 454 is about 4 $\mu$m. The width 486 of the pixel is about 6 $\mu$m. The microlens 468 thus gathers the image light 422 over the entire width 486 of the pixel and focuses it onto the smaller width 488 of the light sensitive region 454. An image path 484 having a relatively high angle of incidence is thus straightened by the field lens 482 and directed substantially vertically into the pixel 452.

Figure 9:
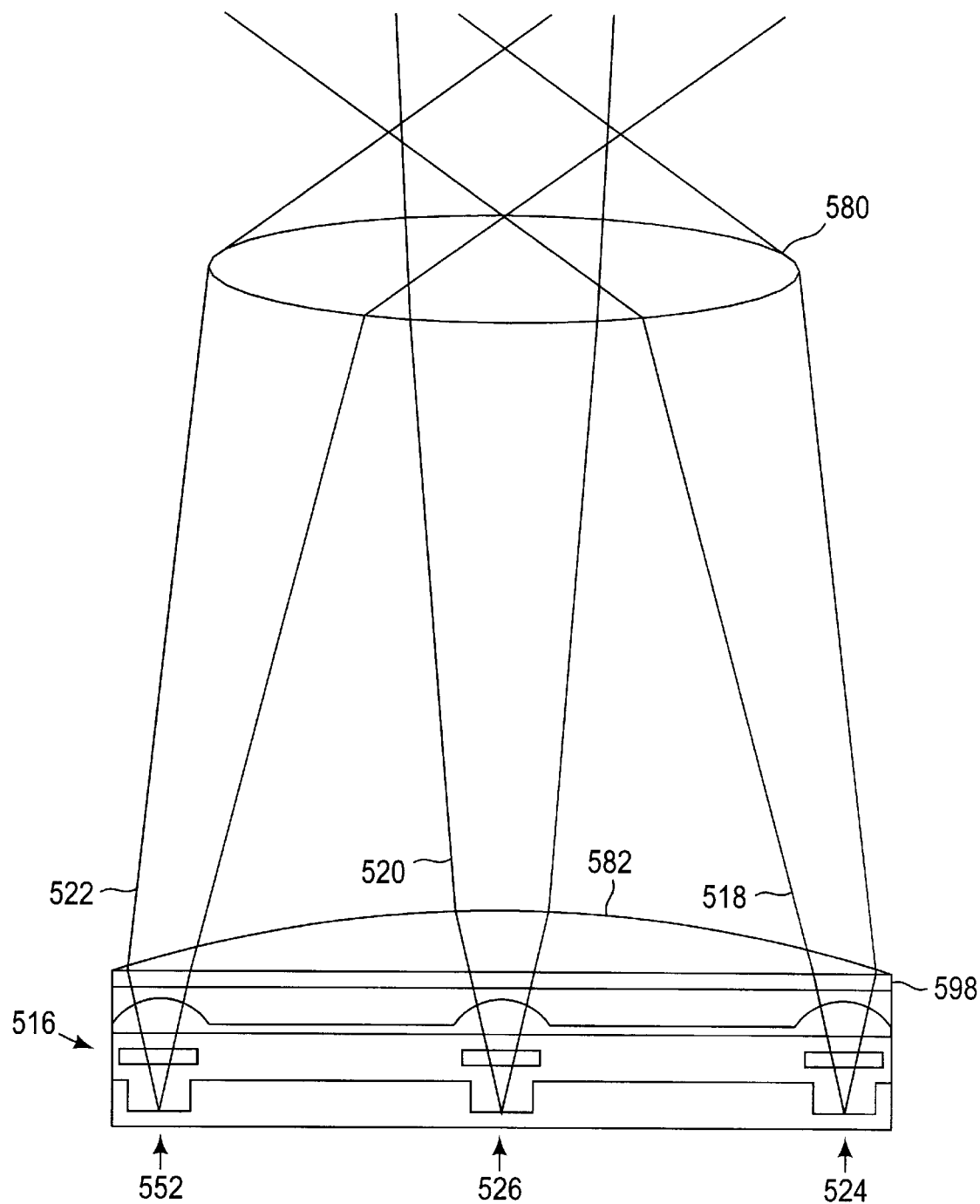
FIG. 9 is a cross-sectional view of a lens system and electronic sensor in which a field lens is mounted to the cover of the electronic sensor.

In another embodiment illustrated in FIG. 9, the electronic sensor 516 further comprises a cover 598, to which the field lens 582 is mounted. The field lens 582 may be mounted to the cover 598 of the electronic sensor 516 in any suitable manner, such as with an adhesive which transmits image light 518, 520, and 522, or by attaching it at the edges with mechanical clips (not shown).

In this embodiment, image light 518, 520, and 522 passes through a near-telecentric lens 580 and is focused onto the field lens 582. The field lens 582 straightens the image light 518, 520, and 522 so that it travels nearly vertically down onto the pixels 524, 526, and 552.

Figure 10:
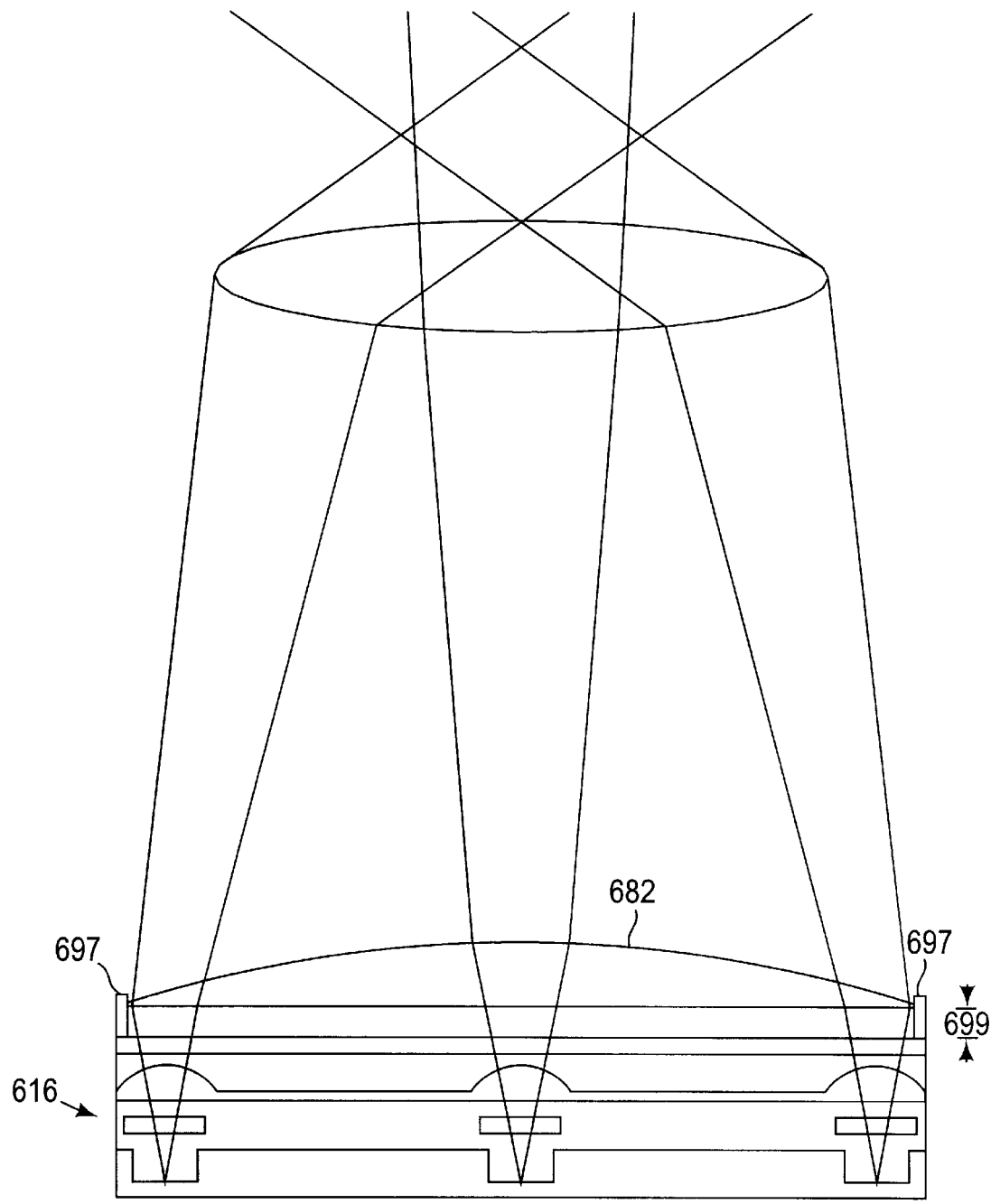
FIG. 10 is a cross-sectional view of a lens system and electronic sensor in which a field lens is mounted over the cover of the electronic sensor.
Figure 11:
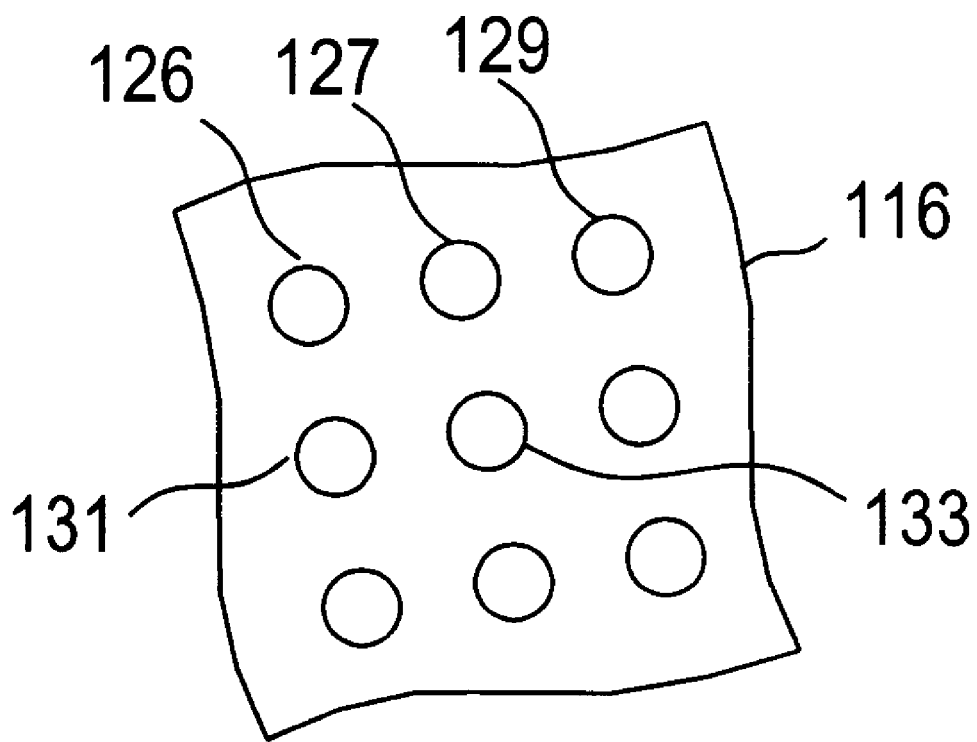
FIG. 11 is a schematic representation of a portion of a two dimensional photosensor array.

Alternatively, as illustrated in FIG. 10, a field lens 682 may be mounted a relatively small distance 699 above an electronic sensor 616, ranging from a distance of about 0.1 mm to about 2 mm. The field lens 682 may be mounted in the digital camera 102 above the electronic sensor 616 in any suitable manner, such as by mounting posts 697.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. An optical system for imaging light in a digital camera, comprising:
    an electronic sensor having an area array of pixels for detecting said image light;
    a lens for focusing said image light onto said electronic sensor, wherein said lens comprises a near-telecentric lens; and
    one or more field lenses positioned adjacent said electronic sensor so as to be substantially in the path of said image light for directing said image light onto said area array of pixels.

2. The optical system of claim 1, wherein said one or more field lenses redirect said image light onto said area array of pixels.

3. The optical system of claim 1, wherein said one or more field lenses are constructed of plastic.

4. The optical system of claim 1, wherein said one or more field lenses are constructed of glass.

5. The optical system of claim 1, wherein said one or more field lenses reduces an angle of incidence of at least a portion of said image light upon said area array of pixels.

6. The optical system of claim 1, further comprising one or more color filters positioned in said image light between said area array of pixels and said one or more field lenses.

7. The optical system of claim 6, further comprising an array of microlenses positioned in said image light between said area array of pixels and said one or more field lenses.

8. The optical system of claim 1, further comprising a substantially flat cover mounted over said area array of pixels, wherein said one or more field lenses are attached to said cover.

9. The optical system of claim 1, wherein said one or more field lenses are integral to a package for said electronic sensor and act as a cover to provide physical protection to said electronic sensor.

10. The optical system of claim 1, wherein said area array of pixels comprises a center region and a peripheral region, and wherein an angle of incidence of said image light upon said area array of pixels is substantially equal in said center region and said peripheral region after said image light has passed through said one or more field lenses.

11. A method for reducing the angle of incidence of image light rays falling upon an electronic sensor in a digital camera, comprising:

providing a near-telecentric lens to focus said image light rays; and mounting a field lens between said near-telecentric lens and said electronic sensor so as to be substantially in the path of said image light rays.

12. The method of claim 11, wherein said electronic sensor further comprises a cover, and wherein mounting said field lens over said electronic sensor comprises attaching said field lens to said cover.

13. An optical apparatus in a digital camera, the apparatus consisting of:

a two-dimensional array of light detecting pixels mounted in said digital camera substantially in a light path of said optical apparatus and substantially perpendicular to an optical axis of said digital camera; and a field lens having a substantially flat bottom surface and a convex upper surface and a positive focal length, said field lens being mounted in said digital camera in front of said two-dimensional array of light detecting pixels so that said substantially flat bottom surface is parallel to and mounted adjacent said two-dimensional array of light detecting pixels and the light path passes through said field lens before reaching said two-dimensional array of light detecting pixels.

14. The apparatus of claim 13, further comprising a substantially transparent cover attached in a parallel fashion to said two-dimensional array of light detecting pixels between said two-dimensional array of light detecting pixels and said field lens.

15. The apparatus of claim 14, wherein said field lens is mounted to said substantially transparent cover.

16. The apparatus of claim 14, wherein said field lens is mounted above and parallel to said substantially transparent cover.

17. The apparatus of claim 13, wherein said field lens is mounted to a light-facing side of said two-dimensional array of light detecting pixels as a cover.

\* \* \* \* \*